United States Patent [19]
Perzl et al.

[11] Patent Number: 5,067,135
[45] Date of Patent: Nov. 19, 1991

[54] GAS LASER APPARATUS

[75] Inventors: Peter R. Perzl, Fürstenfeldbruck; Wolfgang Rüberg, Aschheim; Heinz B. Puell, Munich, all of Fed. Rep. of Germany

[73] Assignee: Haraeus Holding GmbH, Hanau am Main, Fed. Rep. of Germany

[21] Appl. No.: 519,130

[22] Filed: May 4, 1990

[30] Foreign Application Priority Data
May 6, 1989 [DE] Fed. Rep. of Germany ....... 3914923

[51] Int. Cl.⁵ .................................... H01S 3/0971
[52] U.S. Cl. ................................. 372/83; 372/86; 372/87
[58] Field of Search ................. 372/38, 87, 86, 83; 315/262

[56] References Cited

U.S. PATENT DOCUMENTS

| | | | |
|---|---|---|---|
| 3,914,648 | 10/1975 | Friedman et al. | 372/72 |
| 4,088,965 | 5/1978 | Lauderslager et al. | 372/87 |
| 4,126,833 | 11/1978 | Hundstad et al. | 372/86 |
| 4,345,331 | 8/1982 | Hoag | 372/87 |
| 4,613,971 | 9/1986 | Brumme et al. | 372/87 |
| 4,922,504 | 5/1990 | Teva | 372/87 |

Primary Examiner—Frank Gonzalez
Assistant Examiner—Susan S. Morse
Attorney, Agent, or Firm—Felfe & Lynch

[57] ABSTRACT

A discharge device, especially for a gas laser, has a discharge chamber through which a gas flows at high velocity and the gas discharge burns as a steady-field discharge between an anode and a cathode lying opposite the anode as the main electrodes extending transversely of the gas flow. To obtain a high ionization rate with a low alternating-current power consumption, while at the same time pre-ionizing the entire volume of incoming gas present between the cathode and anode, at least two pre-ionizing electrodes are present, one of which is in front of the cathode and the other in front of the anode in the direction of flow, and the pre-ionizing electrodes are out of phase with one another.

7 Claims, 3 Drawing Sheets

GAS LASER APPARATUS

BACKGROUND OF THE INVENTION

The invention relates to a discharge device, especially for a gas laser, having a discharge chamber through which a gas flows at high velocity and in which the gas discharge burns as a directcurrent discharge between an anode and a cathode situated opposite the anode, the anode and cathode serving as main electrodes extending transversely of the gas stream. Such a discharge device also has at least one pre-ionizing electrode which is enveloped in dielectric material and fed with alternating current, has a length corresponding approximately to that of the cathode and anode, and is situated ahead of the cathode and/or anode in the direction of flow of the gas.

A discharge device of this kind, in the form of a gas laser, is disclosed in U.S. Pat. No. 4,488,309. This gas laser has an anode extending in the direction of flow and defining one side of the gas discharge channel carrying the gas; opposite this anode is a plurality of pin-like single cathodes each disposed transversely of the gas flow and connected by high-ohmic input resistances to the direct-current source. Approximately in the center between the anode and the single cathodes there is disposed a pre-ionizing electrode in rod form having a conductive core contained inside of a dielectric coating. On account of the pre-ionizing electrode disposed in the center of the gas channel undesired turbulence is produced resulting in flow losses. The pre-ionizing electrode is connected to an alternating current source. Furthermore, a capacitance is present between the anode and the ground potential, and an inductance between the output of the power source and the anode, and these serve for the accumulation of energy for pulsing. The capacitor and inductor must be designed for a high pulse energy in order to keep the constant power level of the direct-current source low. With this arrangement a stable DC luminous discharge is produced, which can easily be switched and pulsed, i.e., has good starting characteristics; also, the voltage of the DC discharge is lowered. In this circuit the pre-ionizing discharge burns exclusively between the pre-ionizing electrode and the anode, since high input resistances are in the cathode circuit. The result is that the gas volume in the discharge chamber is irregularly pre-ionized and the power required for the pre-ionization is relatively high. The cost of the power supply circuit is high, since the production of high-frequency alternating-current power is disproportionately great in comparison to a DC power supply circuit.

Federal Patent 28 56 328, to which U.S. Pat. No. 4,449,220 corresponds (incorporated herein by reference), discloses another discharge device for a gaseous medium, in which the auxiliary discharge is a directcurrent pre-ionization produced by a plurality of pre-ionizing electrodes in the form of pins projecting from the wall of the discharge chamber. A power of the order of magnitude of 40% of the total input power is required for the auxiliary discharge. This is important also because the individual auxiliary electrodes are provided with high input impedances to stabilize the additional discharge, and they cause considerable additional loss of power. Additional cost is involved if the discharge is to be switched rapidly, since either two independent supply voltages must be used, or the main and secondary discharges must be clearly separated from one another.

One embodiment of pre-ionizing devices of this kind is disclosed in WO 82/01281, which especially describes the shape of single additional electrodes for the direct-current pre-ionization, and gives disks, T-shaped hooks, U-shaped hooks and L-shaped hooks as possible shapes, extending into the discharge chamber. This pre-ionizing arrangement calls for a high power input.

SUMMARY OF THE INVENTION

The present invention is addressed to the problem of designing a discharge device, especially a gas laser, of the kind described above, so that a high ionizing power will be obtained with a low alternating-current power drain, so that the entire volume of the inflowing gas that is present between the cathode and anode will be pre-ionized.

This problem is solved by providing at least two pre-ionizing electrodes, one being placed ahead of the cathode and the other ahead of the anode in the direction of flow, and by operating the pre-ionizing electrodes out of phase with one another. The arrangement of two pre-ionizing electrodes close to the main electrodes, i.e., close to the cathode and close to the anode, has the advantage that they lie outside of the main flow of the gas and thus cause no appreciable disturbances of its flow. The auxiliary discharge burning between these two pre-ionizing electrodes fills the entire space between the cathode and anode as seen transversely of the direction of flow, so that in the area ahead of the main electrodes a uniform pre-ionization is obtained of the entire inflowing volume of gas. The pre-ionizing electrodes can at the same time be situated so far out on the margins of the gas discharge channel that they are immediately in front of the main electrodes or are located out of reach of the flow between the main electrodes; in the latter case the pre-ionizing electrodes are closer to the walls of the gas discharge channel than the main electrodes. In the case where the pre-ionizing electrodes are disposed in the area of the main electrodes, it is important that the latter be swept by the gas on all sides in order thereby to obtain a cooling action; this cooling is necessary especially in the area of the cathode. Consequently, the pre-ionizing electrodes should, as mentioned above, be offset slightly laterally from the main electrodes as seen in the direction of flow of the gas. The potential differences at the pre-ionizing electrodes as required for an AC discharge are produced by the different phasing of the supply voltage applied to the two pre-ionizing electrodes.

The main discharge thus finds a completely pre-ionized discharge path in front of it between the two main electrodes, so that, on the one hand, the main discharge can be operated even at extremely low current intensities, and, on the other hand, switching and pulsing are easily possible; the energy required is thus kept very low.

Additional pre-ionizing electrodes can be disposed parallel to one another between the at least two pre-ionizing electrodes, adjacent pre-ionizing electrodes being out of phase with one another. This brings it about that the individual AC discharge gaps become shorter and consequently the necessary discharge voltages become lower. This substantially reduces the danger of electrical flashovers and parasitic discharges at the electrode leads. Furthermore, the possibility is thus obtained of controlling the flow and its turbulence by means of electrode rods situated in the channel.

Connecting the pre-ionizing electrodes directly adjacent to the main electrodes to their corresponding main electrodes through a capacitance constitutes a simple way of providing a low-impedance connection of the pre-ionizing electrodes to the main electrodes.

The capacitances are advantageously variable capacitors to permit individual balancing. Connecting at least one of the main electrodes, along with the pre-ionizing electrode associated with it circuit-wise, to the DC source through an inductance offers the advantage that any parasitic AC current flowing through the DC power supply will be suppressed.

Actually, the effects of capacitive coupling of the AC and DC system via electrodes and leads, and the inductances of electrical lines, electrodes, and especially the DC power source itself, are very important. This means that the entire system should be tuned by the insertion of additional inductances and capacitors so that the AC discharge, or the combined AC-DC auxiliary charge, will fill both the area between the dielectric pre-ionizing electrodes and the two individual gaps with approximately equal intensity.

In order to bring the AC circuit of the pre-ionizing electrodes and the DC circuit of the main electrodes into a fixed relationship to one another, the AC power supply of the pre-ionizing electrodes has an output transformer whose secondary winding is connected on the one hand to the pre-ionizing electrodes and on the other hand it has a tap which is at ground potential. Inasmuch as the wall of the discharge chamber and the entire discharge vessel is at ground potential, and also, as stated above, the DC power supply has a connection to ground, this coupling is accomplished. This tapping of the secondary winding of the output transformer is to be made asymmetrical if, for example, different surfaces of anode and cathode result in different discharge capacities which then are equalized by this asymmetrical tap to obtain uniform partial discharges.

DETAILED DESCRIPTION OF THE DRAWINGS

Figure 1:
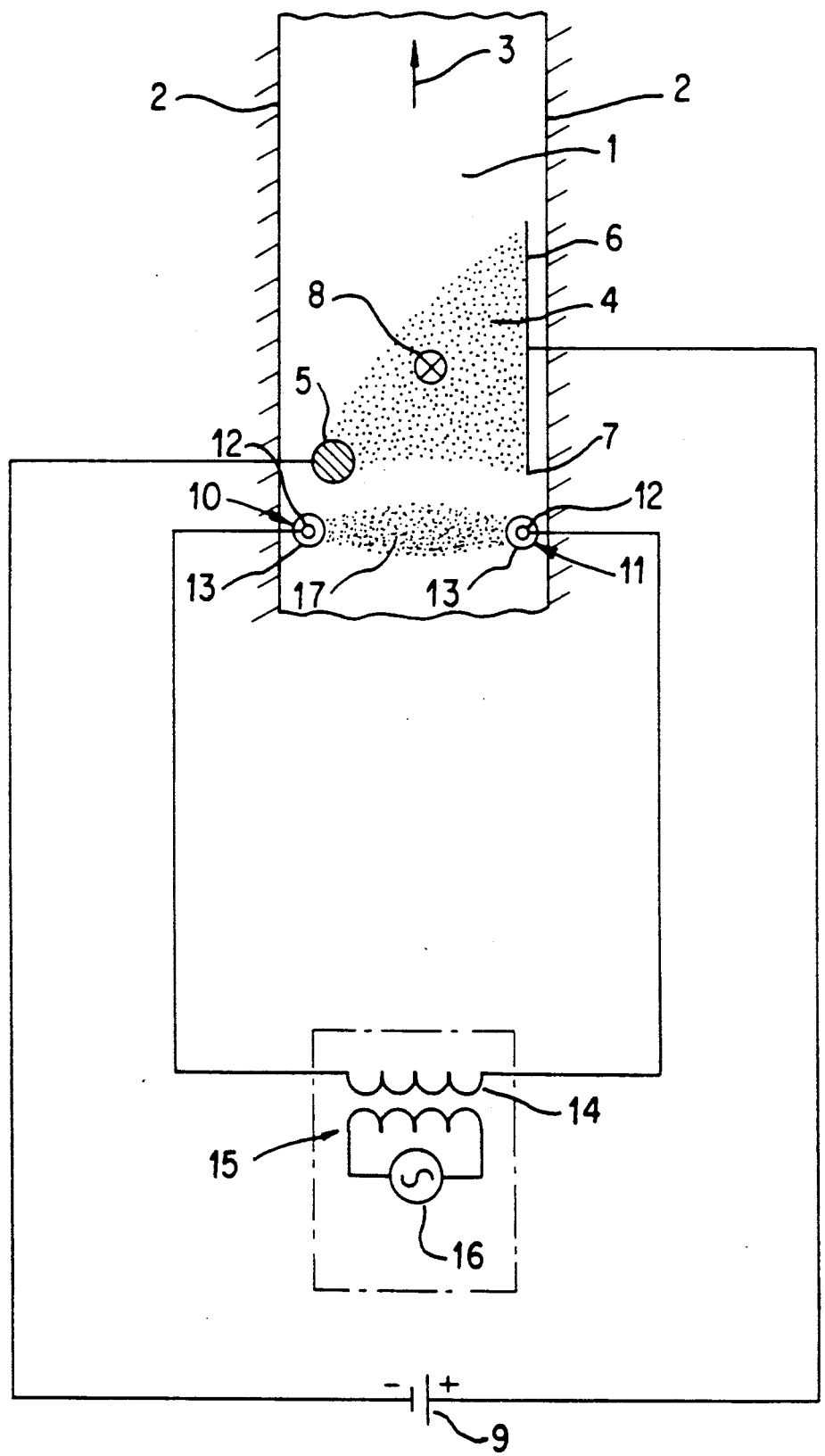
FIG. 1 represents a gas discharge chamber with a pre-ionizing device having two pre-ionizing electrodes, FIG. 2 an arrangement similar in construction to FIG. 1, in which the pre-ionization electrodes are connected to the DC power source for the main electrodes through capacitors and inductors, and FIG. 3 an arrangement corresponding to FIGS. 1, with additional pre-ionizing electrodes.

FIG. 1 is a fragmentary view of a gas discharge channel 1 of a laser having side walls 2 which in the main discharge area 4 define the gas discharge channel transversely of the gas flow indicated by arrow 3. The main discharge takes place between a cathode 5 and an anode 6 extending in the direction of flow, the cathode 5 and the leading edge 7 of the anode 6 being at approximately the same level transversely of the direction of flow of the gas. The optical axis of the resonator is indicated by the arrow 8. Cathode 5 and anode 6 are connected to a DC power source 9. The main electrodes 5 and 6, in the form of cathode and anode, extend transversely of the gas flow, i.e., perpendicular to the plane of drawing. Two pre-ionizing electrodes 10 and 11 are disposed upstream from the cathode 5 and the anode 6, the pre-ionizing electrode 11 associated with the anode 6 being positioned immediately in front of the upstream edge, at a distance from the latter, while the pre-ionizing electrode 10 associated with the cathode 5 is offset laterally toward the side wall 2 of the gas discharge channel. This lateral offset allows the gas to flow unhampered over the cathode 5 situated in back of the pre-ionizing electrode 10 and cool it without interfering with its flow. The two pre-ionizing electrodes consist of an electrically conductive core 12 which is surrounded by an envelope 13 of dielectric material; the dielectric material is fused vitreous silica. The two pre-ionizing electrodes 10 and 11 are connected to the terminals of the secondary winding 14 of a power transformer 15 connected to the AC source 16. With this transformer 15, a low voltage on the primary side not only produces a high voltage on the secondary side as a power supply for the preionizing electrodes 10 and 11, but also causes a phase shift between the voltages on the pre-ionizing electrodes 10 and 11 so as to bring about a potential difference between these electrodes. Between these two pre-ionizing electrodes 10 and 11 an auxiliary discharge 17 burns uniformly over the entire width of the gas discharge channel 17 transversely of the direction of flow 3, due to the position occupied by the two pre-ionizing electrodes 10 and 11 in the gas discharge channel. In this manner the gas is completely and uniformly pre-ionized within the reach of the auxiliary discharge 17 at the input end of the main electrodes 5 and 6. With the expenditure of a small amount of energy an immediate ignition of the main discharge 4 is obtained between the main electrodes 5 and 6. A stable main discharge can be sustained at the main electrodes 5 and 6 even at very low currents.

Figure 2:
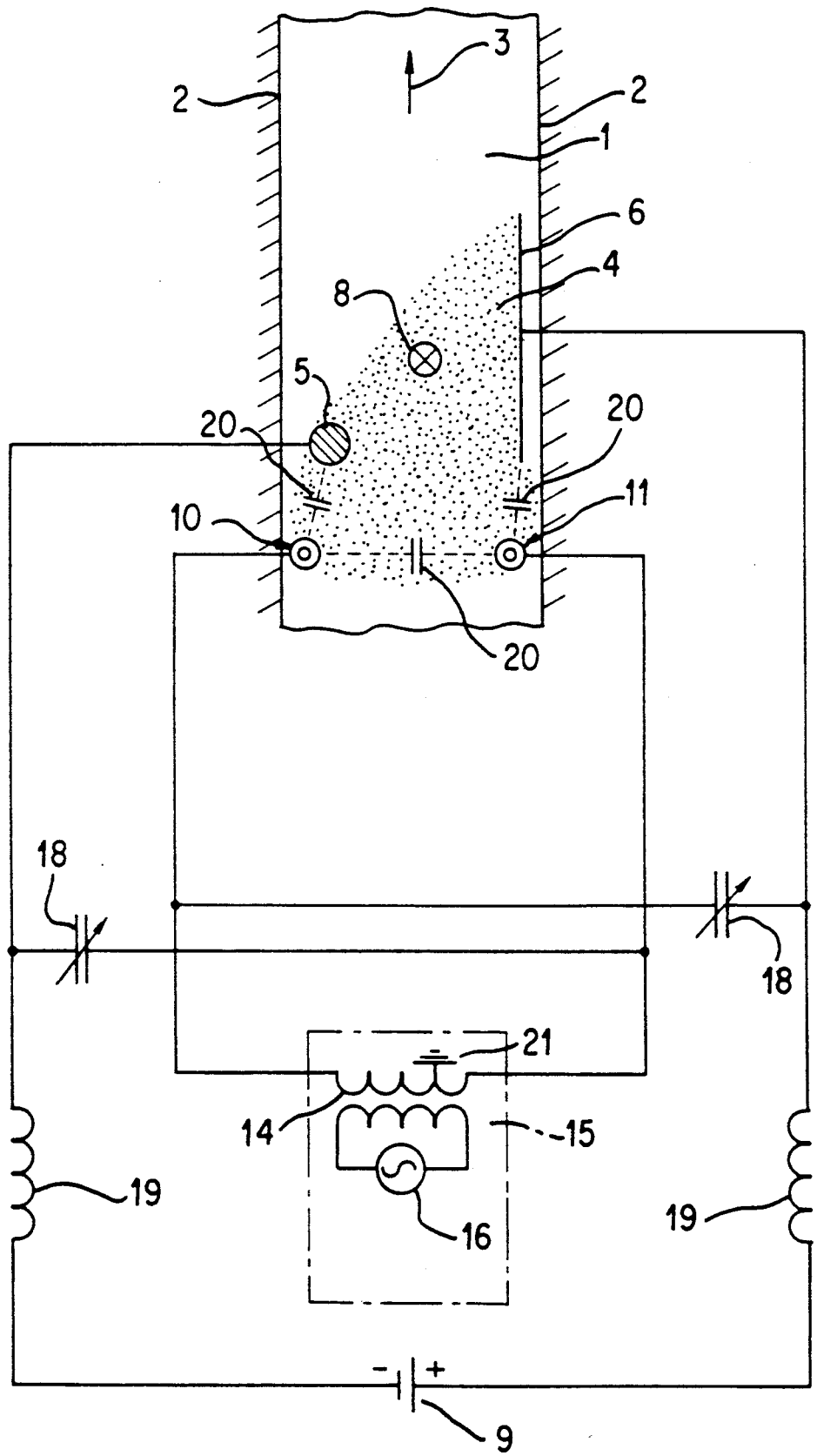

Unlike the embodiment in FIG. 1, in FIG. 2 the DC power source of the main electrodes 5 and 6 and the AC power source of the pre-ionizing electrodes 10 and 11 are coupled together via variable condensers 18, so as to be out of phase, i.e., the preionizing electrode 10 is connected through the variable condenser 18 to the anode 6, and the pre-ionizing electrode 11 associated with anode 6 is connected to anode 5 through the variable condenser 18. Also, the condensers 18 and the anode 6 and cathode 5 are each connected to the DC power supply of the main electrodes 5 and 6 through an inductance 19. In addition, in FIG. 2 the discharge capacitance present between the pre-ionizing electrode 10 and cathode 5, and between pre-ionizing electrode 11 and anode 6, are indicated by the condenser symbols 20. Through the interaction of transformer 15, variable condensers 18, inductances 19 and discharge capacitances 20 between the pre-ionizing electrodes 10 and 11 on the one hand and the main electrodes 5 and 6 on the other, an out-of-phase, compensating circuit is obtained which is tunable by the condensers 18, and which especially permits a fine tuning to compensate for the geometrical conditions in the discharge chamber of the laser during its operation. On the secondary winding 14 of the transformer 15 a tap 21 at ground potential is indicated, which prevents the potential of the pre-ionizing electrodes 10 and 11 and the potential of the main electrodes 5 and 6 from shifting toward either of the main electrodes 5 and 6. The location of the tap on the secondary winding 14 is off-center on the total length of the winding in order to compensate the different geometrical expanse of the two main electrodes 5 and 6; unlike what is shown in FIG. 2, the tap 21 can also be shifted toward the cathode 5.

Figure 3:
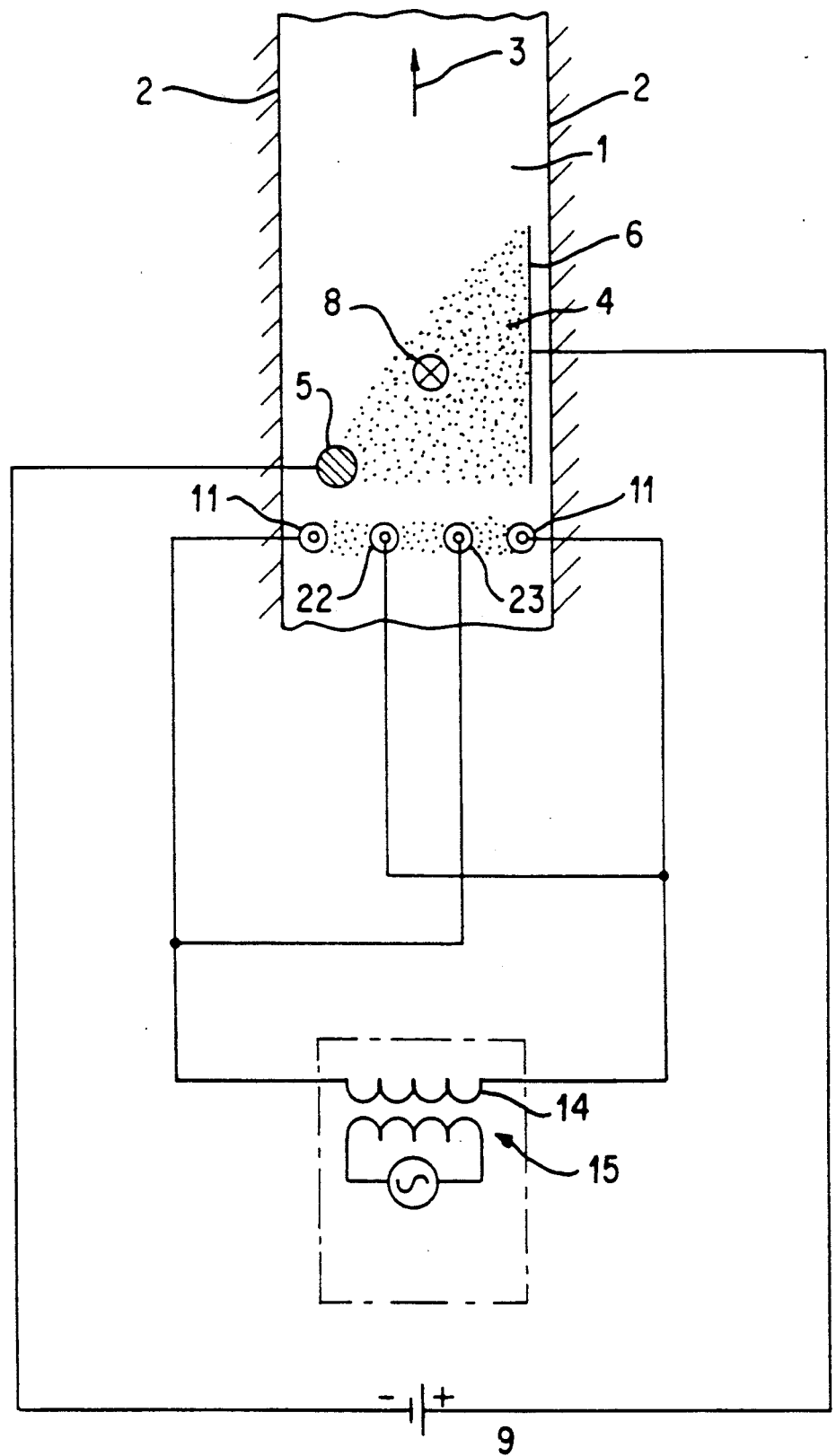

In FIG. 3, unlike the embodiments in FIGS. 1 and 2, in addition to the two outer pre-ionizing electrodes 10 and 11, two additional pre-ionizing electrodes 22 and 23 are inserted, all of the pre-ionizing electrodes 10, 11, 22 and 23 being parallel to one another. These additional pre-ionizing electrodes 22 and 23 are connected crosswise with the two outer pre-ionizing electrodes 10 and 11 so that adjacent electrodes will be out of phase with one another. In this manner, short single discharge gaps are obtained between the adjacent pre-ionizing electrodes 10, 22, 23 and 11, for which lower discharge voltages will suffice, in comparison to the embodiments in FIGS. 1 and 2. The number of these additional pre-ionizing electrodes should be kept small so as not to interfere unnecessarily with the free cross section for the flow of the gas. While an even number of additional pre-ionizing electrodes 22 and 23 between the two outer pre-ionizing electrodes 10 and 11 permits a simple arrangement in alternation with the outer electrodes 10 and 11, an odd number of additional pre-ionizing electrodes can, of course, also be arranged between the two outer pre-ionizing electrodes 10 and 11. For example, it is possible to insert a single additional pre-ionizing electrode in addition to the two pre-ionizing electrodes 22 and 23, or else to replace the two additional pre-ionizing electrodes 22 and 23 with a single one. A pre-ionizing electrode of this kind, making up an odd number of pre-ionizing electrodes can be connected to the other pre-ionizing electrodes through a special compensating circuit such that a uniform discharge intensity will be obtained among all the electrodes.

We claim:

1. Apparatus for the input of electrical energy into an active gas in a laser, said apparatus comprising
   a gas discharge chamber through which said gas flows at high velocity, said chamber comprising an input end and an exit end defining a direction of flow of said gas,
   an anode and an elongated cathode lying opposite each other in said discharge chamber and having like lengths extending transversely of the direction of flow,
   a DC power supply connected to said anode and said cathode for applying a voltage therebetween to maintain a steady glow discharge of said active gas flowing therebetween,
   two elongated pre-ionizing electrodes lying opposite each other in said discharge chamber, each electrode being enveloped in dielectric material and having a like length as said anode and said cathode, one of said electrodes being placed ahead of the anode in the direction of flow, the other electrode being placed ahead of the cathode in the direction of flow, and
   an AC power supply connected to said pre-ionizing electrodes and including means for operating said electrodes out of phase with each other so that a potential difference is produced between said electrodes and an auxiliary discharge burns ahead of said cathode and said anode in the direction flow.

2. Apparatus as in claim 1 further comprising at least two additional elongated pre-ionizing electrodes running parallel to each other and disposed between said pre-ionizing electrodes ahead of said anode and said cathode, the electrodes in each adjacent pair of pre-ionizing electrodes being out of phase with each other.

3. Apparatus as in claim 1 further comprising
   means connecting one of said pre-ionizing electrodes to said cathode with a low impedance relative to the AC power supply, and
   means connecting the other of said pre-ionizing electrodes to said anode with a low impedance relative to the AC power supply.

4. Apparatus as in claim 3 wherein
   said pre-ionizing electrode ahead of said anode is connected to said cathode by means comprising a capacitance, and
   said pre-ionizing electrode ahead of said cathode is connected to said anode by means comprising a capacitance.

5. Apparatus as in claim 4 where said capacitances are variable capacitances.

6. Apparatus as in claim 4 wherein
   said anode is connected to said DC power supply by means comprising an inductance, and
   said cathode is connected to said DC power supply by means comprising an inductance.

7. Apparatus as in claim 1 wherein said AC power supply comprises an output transformer having a secondary winding connected to said pre-ionizing electrodes, said secondary winding further having a tap which is at ground potential.

* * * * *